United States Patent
Kanno

[19]

[11] Patent Number: 6,103,331
[45] Date of Patent: Aug. 15, 2000

[54] OPTICAL RECORDING MEDIUM COMPRISING ORGANIC DYE THIN FILM

[75] Inventor: Toshiyuki Kanno, Kawasaki, Japan

[73] Assignee: Fuji Electric Co., Ltd., Kawasaki, Japan

[21] Appl. No.: 09/160,190

[22] Filed: Aug. 25, 1998

[30] Foreign Application Priority Data

Sep. 26, 1997 [JP] Japan ................................. 9-262297
Sep. 26, 1997 [JP] Japan ................................. 9-262298

[51] Int. Cl.$^7$ ......................................................... B32B 3/00
[52] U.S. Cl. ........................ 428/64.1; 428/64.4; 428/64.8; 428/457; 428/913; 430/270.16; 430/270.2; 430/495.1; 430/945; 369/283; 369/288
[58] Field of Search ............................... 428/64.1, 64.2, 428/64.4, 64.8, 457, 913; 430/270.14, 270.16, 270.2, 495.1, 945; 369/283, 288

[56] References Cited

U.S. PATENT DOCUMENTS

| | | |
|---|---|---|
| 2,112,139 | 3/1938 | Brooker et al. . |
| 2,734,900 | 2/1956 | Heseltine . |
| 2,887,479 | 5/1959 | Heseltine . |
| 3,925,077 | 12/1975 | Lewis ................................. 96/35 |
| 4,891,305 | 1/1990 | Oba et al. . |

FOREIGN PATENT DOCUMENTS

| | | |
|---|---|---|
| 56-46221 | 4/1981 | Japan . |
| 57-11090 | 1/1982 | Japan . |
| 57-66541 | 4/1982 | Japan . |
| 57-82094 | 5/1982 | Japan . |
| 57-82095 | 5/1982 | Japan . |
| 59-24692 | 2/1984 | Japan . |
| 59-55794 | 3/1984 | Japan . |
| 59-124894 | 7/1984 | Japan . |
| 59-203247 | 11/1984 | Japan . |
| 60-44389 | 3/1985 | Japan . |
| 60-71296 | 4/1985 | Japan . |
| 61-290092 | 12/1986 | Japan . |
| 62-432 | 1/1987 | Japan . |
| 62-201288 | 9/1987 | Japan . |
| 62-201289 | 9/1987 | Japan . |
| 63-1594 | 1/1988 | Japan . |
| 63-168201 | 7/1988 | Japan . |
| 63-218398 | 9/1988 | Japan . |
| 1-31868 | 2/1989 | Japan . |
| 1-40389 | 2/1989 | Japan . |
| 1-21798 | 4/1989 | Japan . |
| 1-178494 | 7/1989 | Japan . |
| 2-87341 | 3/1990 | Japan . |
| 5-38879 | 2/1993 | Japan . |
| 5-67352 | 3/1993 | Japan . |
| 5-139047 | 6/1993 | Japan . |
| 6-40162 | 2/1994 | Japan . |

(List continued on next page.)

OTHER PUBLICATIONS

"Write Once Read Multiple (WORM) Optical Disk that Meets the CD Standards Ensures Recording Due to Thermal Deformation of the Critical Surface Between a Substrate and a Pigment Layer" Nikkei Electronics, vol. No. 445 (Jan. 23, 1989).

*Primary Examiner*—Elizabeth Evans
*Attorney, Agent, or Firm*—Venable; Robert J Frank

[57] ABSTRACT

This invention provides an optical recording medium complying with the DVD standards, having high sensitivity, possessing high dye film stability, having a high C/N ratio during high density recording, and being capable of reducing jitter components contained in reproduced signals, by finding an organic dye thin film and a medium configuration which can be adapted for a short wavelength semiconductor laser (wavelength 500 to 700 nm) and which are satisfactory in optical characteristics, and chemical, photochemical, physical and thermal stability, the optical recording medium comprising at least a recording layer and a metallic reflecting layer laminated on the surface of a grooved resin substrate transparent to laser light; wherein the recording layer comprises an organic thin film consisting essentially of a styrylcyanine dye of a specific structure and adapted for a short wavelength laser.

18 Claims, 4 Drawing Sheets

FOREIGN PATENT DOCUMENTS

| | | |
|---|---|---|
| 6-199045 | 7/1994 | Japan . |
| 6-320869 | 11/1994 | Japan . |
| 6-338059 | 12/1994 | Japan . |
| 7-44904 | 2/1995 | Japan . |
| 7-52544 | 2/1995 | Japan . |
| 7-156550 | 6/1995 | Japan . |
| 7-161069 | 6/1995 | Japan . |
| 7-186530 | 7/1995 | Japan . |
| 7-251567 | 10/1995 | Japan . |
| 7-262611 | 10/1995 | Japan . |
| 8-99467 | 4/1996 | Japan . |
| 2547033 | 8/1996 | Japan . |
| 8-306074 | 11/1996 | Japan . |

OPTICAL RECORDING MEDIUM COMPRISING ORGANIC DYE THIN FILM

This application is based on U.S. patent application Nos. 262,297/1997 and 262,298/1997 filed on Sep. 26, 1997 in Japan, the content of which is incorporated hereinto by reference.

BACKGROUND OF THE INVENTION

1. Field of the Invention

The present invention relates to an optical recording medium for high density writing (recording) and reading (reproduction) using short wavelength laser light. More particularly, the invention relates to a write once optical recording medium complying with the DVD standards which is capable of high density recording and reproduction of information with small spot light by the use of a highly sensitive, highly reliable, organic dye thin film changing in reflectance with the wavelength of laser light.

2. Description of Related Art

Recordable optical information recording media are in very widespread use. An optical recording medium is characterized in that it neither wears nor degrades, since it is free from contact with a recording/reproducing head. Using a light beam with a more tiny spot diameter, the optical recording medium has attracted wider attention as a large capacity information carrier, and its energetic development is under way. Such an optical information recording medium acts, for example, by focusing a laser light beam on a recording layer to convert it into a thermal energy, changing the properties of a recording film by fusion, decomposition, removal or the like to make recording (form pits), and reproducing recorded information by utilizing differences between the recorded area and the unrecorded area in terms of the quantity of reflected light.

The recording film initially put to practical use was a chalcogenide type metallic film typified by a tellurium-based one. However, this type of film was harmful to the human body, and was formed by a dry process, requiring a high manufacturing cost. Furthermore, the need for a higher density of recording has increased. Thus, there have been increases in proposals and reports on recording media using a recording layer essentially consisting of an organic dye, instead of a recording layer comprising an inorganic metal thin film typified by a tellurium-based one. The reason behind this is that the recording layer essentially consisting of an organic dye is lower in reflectance than a metallic recording layer, but possesses the following satisfactory properties:

(1) Can be formed as a thin film by a low cost wet process typified by spin coating.

(2) Is highly resistant to oxidation and free from corrosion.

(3) Has so low heat conductivity compared with metals that, unlike a metallic recording film, heat does not affect the surroundings, and local heating is possible.

(4) Can form recording pits of a clear shape, ensuring high sensitivity.

As to a structure, many optical information recording media have been proposed which have a so-called air sandwich structure in frequent use comprising an air layer on a recording layer composed of a dye film, or a structure capable of obtaining a reproduction signal in compliance with the CD standards (Japanese Patent Application Publication No. 759343/1991, Japanese Patent Application Laying-open No. 87341/1990, Japanese Patent Application Laying-open No. 67352/1993, and Nikkei Electronics, Jan. 23, 1989 Issue, No. 469, page 107).

A known example of a medium structure complying with the CD standards comprises a light absorbing layer comprising an organic dye formed on an optically transparent resin substrate, a light reflecting layer of Au or the like formed on the light absorbing layer directly or via a rigid layer, and a resin protecting layer formed on the light reflecting layer. That is, an organic dye film alone is not enough to give a high reflectance of 65% or more. Thus, the light absorbing layer comprising the organic dye is formed on the optically transparent resin substrate, the light reflecting layer of Au or the like is formed on the light absorbing layer directly or via the rigid layer, and the resin protecting layer is formed on the light reflecting layer to prepare the optical recording disk complying with the CD standards.

According to this optical recording disk, the organic dye layer absorbs light when irradiated with laser light, whereupon it becomes fused or decomposed, and softens the substrate. As a result, the dye material and the substrate mingle at the interface. Finally, the interface deforms to form record pits. In the resulting deformed recording layer pit area, reflectance varies according to an optical phase difference as with a CD, whereby recorded information can be read. Known as examples of the organic dye used are squarylium dyes (Japanese Patent Application Laying-open Nos. 46221/1981, 218398/1988, 178494/1989, 139047/1993 and 44904/1995), naphthoquinone dyes (Japanese Patent Application Laying-open Nos. 290092/1986, 432/1987, 168201/1988 and 139047/1993), azo dyes (Japanese Patent Application Laying-open Nos. 161069/1995, 251567/1995 and 99467/1996), phthalocyanine dyes (Japanese Patent Application Laying-open Nos. 82094/1982, 82095/1982, 156550/1995, 16068/1995 and 52544/1995), and cyanine dyes (Japanese Patent Application Laying-open Nos. 24692/1984, 87341/1990, 320869/1994, 338059/1994, 199045/1994, 262611/1995 and 201288/1987, and Japanese Patent Application Publication No. 4981/1995 and Japanese Patent No. 2547033) of the following general formula (II):

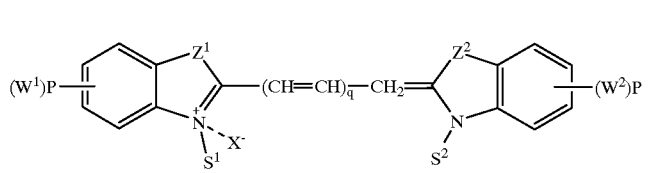

(II)

where $S^1$ and $S^2$ each represent an alkyl group, an aryl group or an alkoxy group, $W^1$ and $W^2$ each represent a substituent such as a halogen atom, a hydrogen atom, an alkyl group, an alkoxy group, an aryl group, an alkoxysulfonyl group, a sulfonylalkyl group, or a cyano group, and $Z^1$ and $Z^2$ each represent a substituent such as a sulfur atom, an oxygen atom, a selenium atom, or an ethylene group.

Of the dyes exemplified above, the cyanine dyes are mainly used, because they can give a high S/N ratio, etc. with high sensitivity, and they have satisfactory thermal characteristics and enable thin film formation. In particular, the cyanine dyes are used generally frequently which have absorption and reflectance generally in the range from the wavelength of a semiconductor laser to around 780 nm to 830 nm, and in which the number q of the methylene chains at the middle of the molecular structure of the general formula (II) denotes 2, because these dyes comply with the CD standards. However, a recording film containing such a dye has the fatal drawback of being unable to serve for a short wavelength laser that the present invention targets.

This recording film containing the dye is also believed to be problematical in terms of degraded reproduction, long-term stability of the dye film, C/N ratio, and jitter component. The causes of these problems may be (i) the phenomenon that the dye itself deteriorates and discolors because of heat accumulation in the recording film area caused by long-term exposure to reading light, (ii) the phenomenon that reading light is absorbed at the interface of the recording film where the pit areas and the unrecorded areas should be discriminated, whereupon the fusion or thermal deformation of the interface gradually occurs, and that similar heat accumulation breaks the boundaries of the pits, (iii) oxidative degradation (discoloration) of the dye due to single state oxygen generated by energy transfer from the dye during optical pumping to oxygen present in the atmosphere, and (iv) degradation phenomena during long-term storage, such as changes in transmittance of the dye due to natural light, oxidation of the cyanine dye, etc., and changes in transmittance and noise generation ascribed to the association or aggregation of the dye due to oxygen or moisture. Varieties of proposals have been put forth in attempts to solve these problematical phenomena (e.g., Japanese Patent Application Laying-open Nos. 201288/1987, 201289/1987, 66541/1982, 124894/1984, 203247/1984, 11090/1982, 44389/1985, 71296/1985, 1594/1988, 11090/1982, 38879/1993 and 262611/1995, and Japanese Patent Application Publication No. 4981/1995). However, sufficient solutions have not been achieved.

Optical recording media with a high recording density complying with the DVD-ROM standards are also under development. These media use a semiconductor laser wavelength of about 600 to 680 nm, a shorter wavelength than for the current CD, and utilize an SHG element or the like to shorten the wavelength of light, thereby restricting the quantity of light from an objective lens up to the laser diffraction limited so as to decrease the beam spot diameter for an increased recording density.

To develop a dye material for DVD-ROM, there have been attempts to improve cyanine dyes for CD typified by the compounds of the general formula (II), and proposals of cyanine dyes for short wavelengths (e.g., Japanese Patent Application Laying-open Nos. 38879/1993, 40162/1994, 320869/1994, 186530/1994, 199045/1994, 262611/1995 and 306074/1996, and Japanese Patent Application Publication Nos. 21798/1989 and 4981/1995). However, may problems still remain unsolved, such that the recording layer fails to achieve sensitivity in agreement with the desired wavelength, or film stability (reliability), and that during high density recording, thermal interference by adjacent pits increase jitter components included in reproduced signals.

SUMMARY OF THE INVENTION

The present invention has been accomplished in light of the above-described problems. Its object is to provide an optical recording medium complying with the DVD standards which is highly sensitive, possesses high dye film stability, has a high C/N ratio during high density recording, and can reduce jitter components contained in reproduced signals. These advantages are to be achieved by finding an organic dye thin film and a medium configuration which can be adapted for a short wavelength semiconductor laser (wavelength 500 to 700 nm) and which are satisfactory in optical characteristics, and chemical, photochemical, physical and thermal stability.

I, the inventor of this application, conducted extensive studies on various dyes to attain the above object. As a result, I have found that an optical recording medium comprising a structure using a recording layer consisting essentially of a specific styrylcyanine dye is adapted for a short wavelength (500 to 700 nm), is highly sensitive, minimally degrades upon reproduction to ensure long-term reliability, is reduced in thermal interference and heat accumulation by pits during high density recording, has an increased C/N ratio during high density recording, can decrease jitter components, and can fulfill the DVD standards. This finding has led to this invention.

That is, the invention covers the following aspects:

(1) An optical recording medium comprising at least a recording layer and a metallic reflecting layer laminated on the surface of a resin substrate which has grooves formed therein and which is transparent to laser light; wherein the recording layer comprises an organic thin film consisting essentially of a styrylcyanine dye of the following general formula (I)

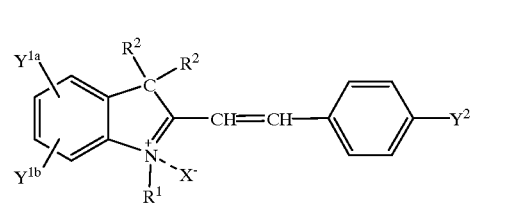

where $R^1$ represents an alkyl group, an aryl group, an arylalkyl group, an alkoxyalkyl group, an acyloxyalkyl group or a hydroxyalkyl group, each having 1 to 18 carbon atoms, or a $C_{3-18}$ substituent having an unsaturated bond, R2 represents an alkyl group or an aryl group, the anion $X^{31}$ represents $I^{31}$, $Br^{31}$, $ClO_4^{31}$, $BF_4^{31}$, $PF_4^{31}$, $SbF_4^{31}$, $CH_3SO_4^{31}$, or $CH_3$—$C_6H_4$—$SO_3$—, both of $Y^{1a}$ and $Y^{1b}$ represent electron attractive groups, or one of $Y^{1a}$ and $Y^{1b}$ represents an electron attractive group, the other representing a hydrogen atom, and $Y^2$ represents an electron donative group, the organic thin film being adapted for a short wavelength laser.

(2) The optical recording medium of (1), wherein both of $Y^{1a}$ and $Y^{1b}$ represent nitro groups, hydroxyl groups, carboxyl groups, carbonyl groups, alkoxy groups, cyano groups, alkoxycyano groups, halogen atoms, or electron attractive groups each having any of them at the end, or one of $Y^{1a}$ and $Y^{1b}$ represents an electron attractive group, the other representing a hydrogen atom, and $Y^2$ represents an electron donative group which is an alkyl group or a nitrogen-containing compound derivative selected from the group consisting of —$NH_2$; —$N(R^3)_2$ where $R^3$ represents an alkyl or aryl group each having 1 to 7 carbon atoms; —$N(R^4R^5)_2$ where $R^4$ and $R^5$ each represent, independently of each other, an alkyl or aryl group having 1 to 7 carbon atoms; a $C_1$—$C_{18}$ alkyl, aryl, arylalkenyl, arylazo, or alkoxy group having at the end —$NH_2$, —$N(R^3)_2$ where $R^3$ is as defined above, or —$N(R^4R^5)_2$ where $R^4$ and $R^5$ are as defined above; a hydrazinocarbonyl group; and an acetamide group.

(3) The optical recording medium of (1), wherein the recording layer is an organic thin film comprising a mixture containing two or more of the styrylcyanine dyes of the general formula (I).

(4) The optical recording medium of (1), wherein the recording layer contains not less than 1% of an oxygen quencher.

(5) The optical recording medium of (1), comprising the metallic reflecting layer laminated on the recording layer, the metallic reflecting layer being a metallic thin film having a higher melting point than the melting point of the recording layer, having a reflectance of 55% or more for a wavelength of laser light, and comprising a single metal or an alloy of metals selected from the group consisting of Al, Au, Ag, Cu, Ni, Ti and chalcogenide metals.

(6) The optical recording medium of (1), comprising the metallic reflecting layer and a protective layer sequentially laminated on the recording layer.

(7) The optical recording medium of (1), comprising a single-sided type substrate and a groove-free substrate bonded together using an adhesive, the single-sided type substrate being the grooved substrate on which the recording layer and the metallic reflecting layer have been laminated in this order, and a protective layer has been further laminated.

(8) The optical recording medium of (1), which is a double-sided type optical recording medium comprising a single-sided type substrate and another single-sided type substrate bonded together via protective layers by the use of an adhesive, each of the single-sided type substrates being the grooved substrate having the recording layer and the metallic reflecting layer laminated thereon in this order, and the protective layer further laminated on the layers.

(9) The optical recording medium of (1), which is a double-sided type optical recording medium comprising the substrate having grooves formed in both surfaces thereof during molding, the recording layer, the metallic reflecting layer, and further a protective layer laminated on both surfaces of the substrate in this order.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
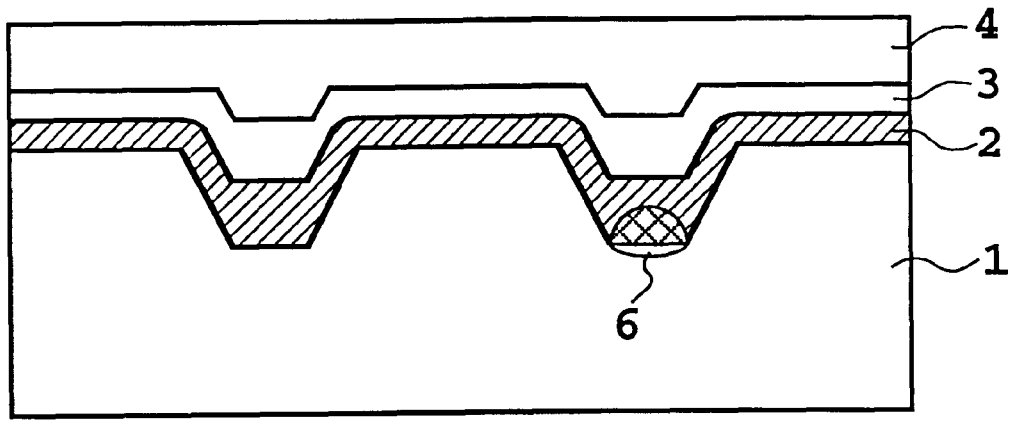
FIG. 1 is a conceptual sectional view of an optical recording medium as an embodiment of the present invention.

Concrete constitutions of the present invention will now be described in detail by reference to the accompanying drawings.

FIGS. 1 to 4 show examples of the structure of the optical recording medium according to the invention. In these drawings, the reference numerals 1, 1' denote substrates, 2 denotes a recording layer, 3 denotes a metallic reflecting layer (a light reflecting film), 4, 4' denote protective films, 5 denotes an adhesive layer, and 6 denotes a recorded deformed pit.

Figure 2:
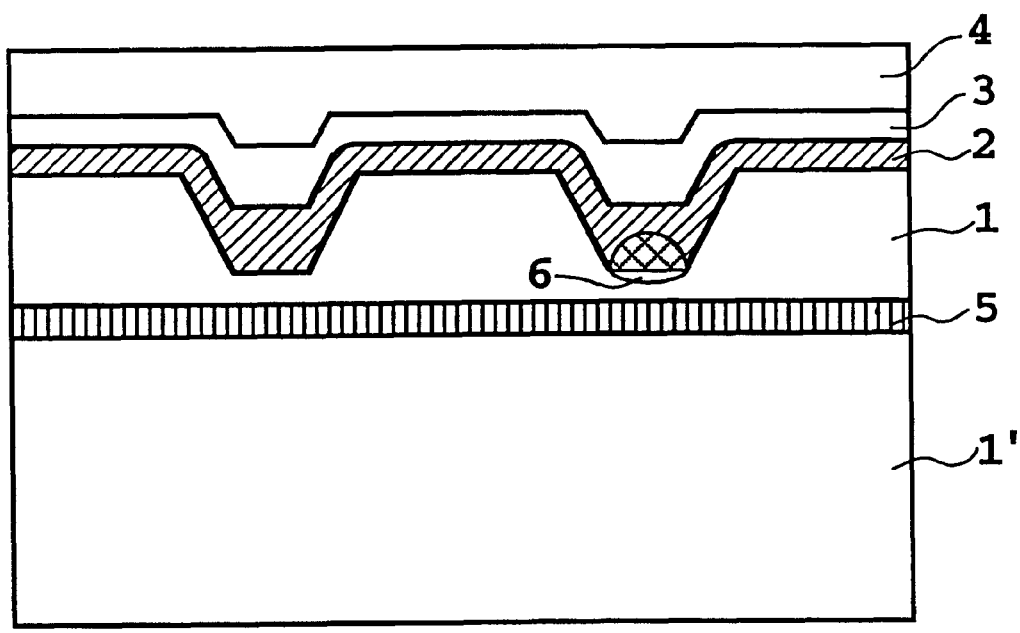
FIG. 2 is a conceptual sectional view of an optical recording medium as another embodiment of the present invention.
Figure 3:
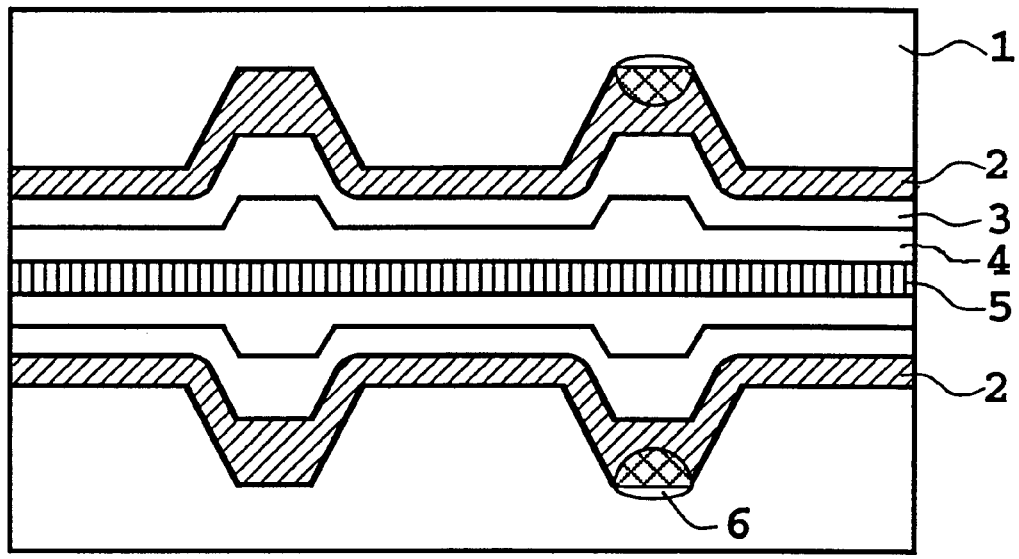
FIG. 3 is a conceptual sectional view of an optical recording medium as still another embodiment of the present invention.
Figure 4:
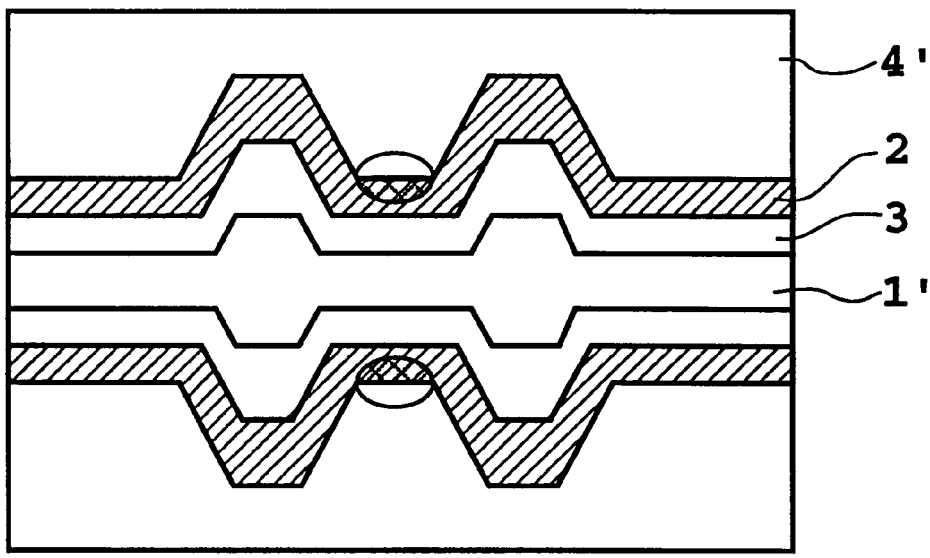
FIG. 4 is a conceptual sectional view of an optical recording medium as a further embodiment of the present invention.

The illustrated substrate 1 is disk-shaped, and prepits or pregrooves for tracking are formed concentrically or spirally in one surface of the substrate 1 shown in FIGS. 1, 2 and 3. The substrate 1 having such prepits or pregrooves comprises an injection molded resin from the viewpoint of productivity. Preferably, it is formed of a resin substantially transparent to recording or reproducing semiconductor laser light (about 500 to 700 nm, especially, 600 to 680 nm) (i.e., the resin having a laser light transmittance of 85% or more). The thickness of the substrate 1 is about 1.0 to 1.5 mm in the exemplified structure shown in FIG. 1, or about 0.5 to 0.65 mm in the types illustrated in FIGS. 2 and 3. According to the structure shown in FIG. 4, prepits or pregrooves are formed by simultaneous molding on both surfaces of the substrate 1, and the thickness of the substrate is about 1.0 to 1.5 mm.

The diameters of the substrates 1 shown in FIGS. 1 to 4 are all about 50 to 120 mm. The resin constituting the substrate 1 is not restricted. However, the main component of the substrate 1 is a thermoplastic resin, such as polycarbonate, polyacrylate, polyester, amorphous olefin, TPX or ARTON RESIN, because of moldability and transparency to light.

The track pitch of the substrate is 0.7 to 1.6 μm. The depth of the groove is utilized for tracking control and information carriage, depending on the phase of laser light. The groove depth is about 50 to 230 nm, preferably, 70 to 200 nm. If the groove is too shallow, the deformation rate of the groove bottom and the effect of deformation on the metallic reflecting film are prone to increase, inducing distortion of reproduced signals. Also, the C/N ratio tends to decrease and jitters tend to increase, causing a decrease in the modulation factor. With too deep grooves, on the other hand, the amount of deformation at the groove bottom of the recording mark area becomes unstable, increasing jitters. As a result, reproduced signals and tracking signals become more dependent on the wavelength. Thus, the depth of the groove relative to the wavelength of semiconductor laser light during high density recording is of importance. Depending on the characteristics, and ease of formation, of the organic thin film as the recording layer 2, the depth and shape of the groove should be optimized. The structure and composition of the material for the recording layer 2 greatly affect the groove.

The recording layer 2 formed on the substrate 1 or 1' is an organic thin film consisting essentially of a styrylcyanine dye expressed by the general formula (I). The styrylcyanine dyes according to the present invention, when formed into thin films, all have absorption and reflection wavelengths at 500 to 700 nm, and thus have sufficient sensitivity and reflectance for the desired laser wavelength (600 to 680 nm).

The substituent $R^1$ of the styrylcyanine dye expressed by the general formula (I) is a group having 1 to 18 carbon atoms, preferably, an alkyl group, an aryl group, an arylalkyl group, an alkoxyalkyl group, an acyloxyalkyl group, or a hydroxyalkyl group, each at position 1 to 8. This group affects solubility, and acts effectively on film-forming properties, in particular.

Alternatively, the substituent $R^1$ of the styrylcyanine dye expressed by the general formula (I) is a group having 3 to 18 carbon atoms, preferably, a substituent at position 3 to 9 which has an unsaturated bond. Preferred examples of R1 are allyl, vinyl, allylidene, allyloxy, crotonoyl, styryl, vinylidene, vinylene, methylidyne, acryloxy, methacryloxy, isopropenyl, ethynyl, and butenyl. Such a group affects solubility, particularly making film-forming properties and the compatibility of the film with the surface of the substrate very good, thus improving stability.

Figure 5:
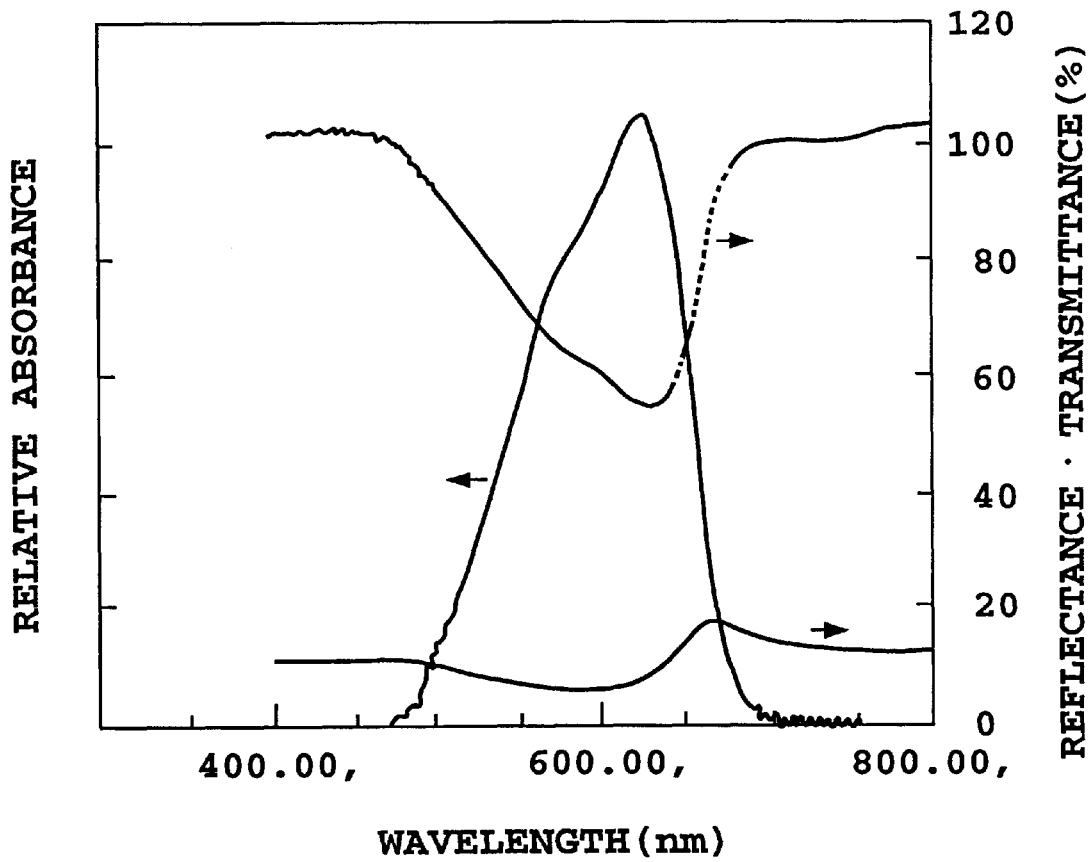
FIG. 5 is a spectral graph of a styrylcyanine dye of the general formula (I-2)
Figure 6:
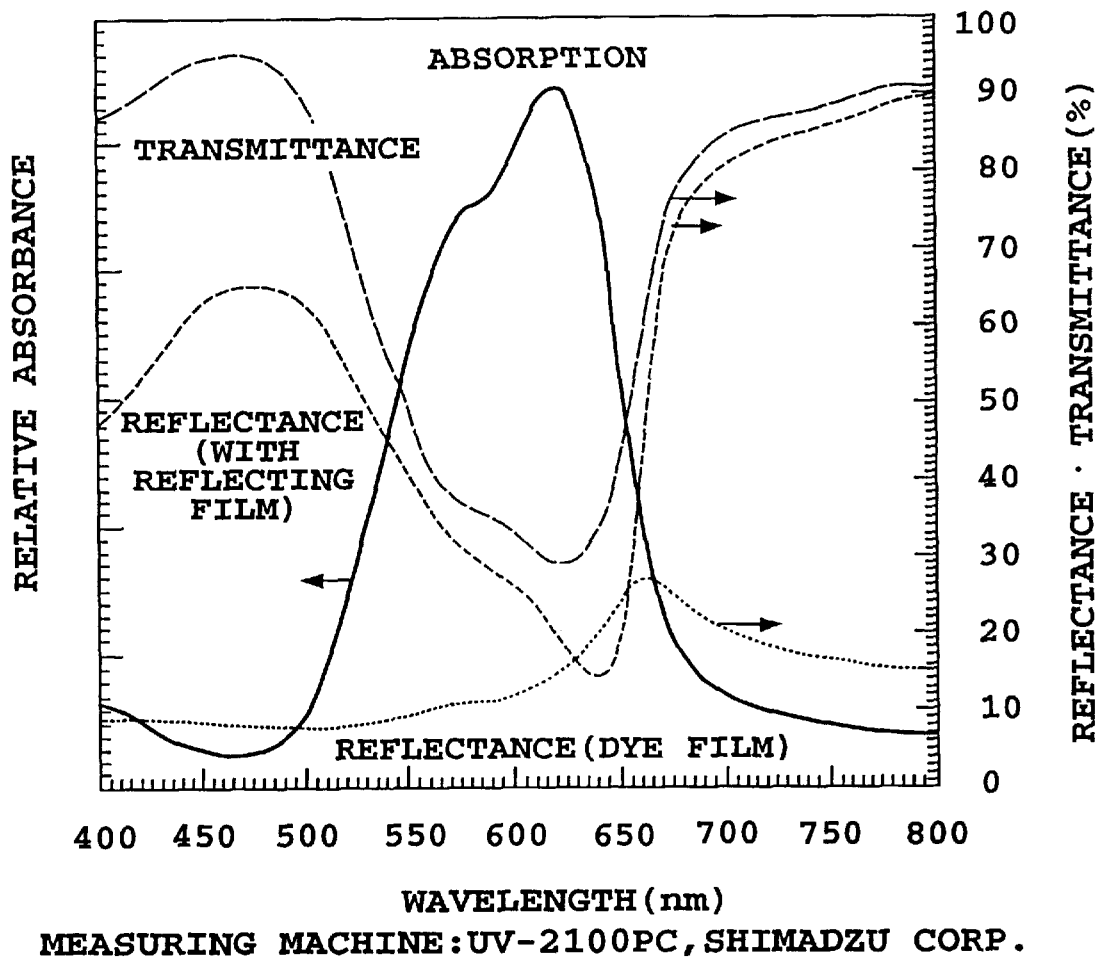
FIG. 6 is a spectral graph of a styrylcyanine dye of the general formula (I-22).

In addition to the introduction of the unsaturated bond into $R^1$, both of $Y^{1a}$ and $Y^{1b}$ represent electron attractive groups, or one of $Y^{1a}$ and $Y^{1b}$ represents an electron attractive group, the other representing a hydrogen atom. Preferably, both of $Y^{1a}$ and $Y^{1b}$ represent nitro groups, hydroxyl groups, carboxyl groups, carbonyl groups, alkoxy groups, cyano groups, alkoxycyano groups, halogen atoms, or electron attractive groups each having any of them at the end, or one of $Y^{1a}$ and $Y^{1b}$ represents an electron attractive group, the other representing a hydrogen atom. $Y^2$ represents an electron donative group, preferably, an electron donative group which is an alkyl group or a nitrogen-containing compound derivative selected from the group consisting of $-NH_2$; $-N(R^3)_2$ where $R^3$ represents an alkyl or aryl group having 1 to 7 carbon atoms; $-N(R^4R^5)_2$ where $R^4$ and $R^5$ each represent, independently of each other, an alkyl or aryl group having 1 to 7 carbon atoms; a $C_1-C_{18}$ alkyl, aryl, arylalkenyl, arylazo, or alkoxy group having at the end $-NH_2$, $-N(R^3)_2$ where $R^3$ is as defined above, or $-N(R^4R^5)_2$ where $R^4$ and $R^5$ are as defined above; a hydrazinocarbonyl group; and an acetamide group. Introduction of any of these substituents makes a spectral graph of a styrylcyanine dye of, say, the general formula (I-2) or (I-22) satisfactory in terms of optical characteristics as shown in FIG. 5 or 6. Since a thin film with high sensitivity, a high S/N ratio, and uniform thickness is easy to provide, a high C/N ratio is obtained. By forming the styrylcyanine dye of the invention into a thin film by a composite process or the like, moreover, it is possible to prevent the aggregation or association of the dye. Because of these effects, there can be obtained an optical recording medium with high sensitivity, a high S/N ratio, a high C/N ratio, uniform film-forming stability, and reliability.

The styrylcyanine dye of the invention can be synthesized by reference to known methods of synthesis (e.g., U.S. Pat. Nos. 2,734,900, 2,112,139 and 2,887,479). Concrete examples of the styrylcyanine dye are offered below.

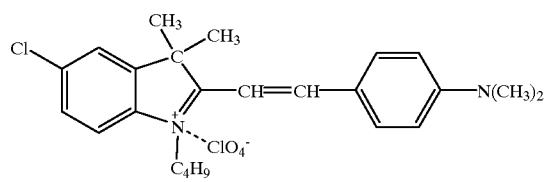

(I-1)

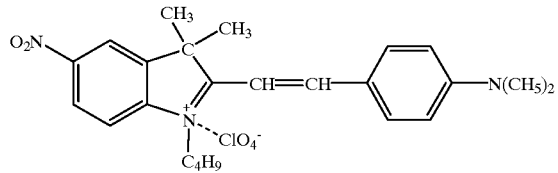

(I-2)

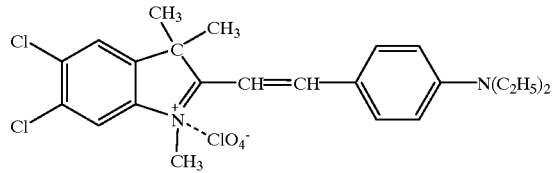

(I-3)

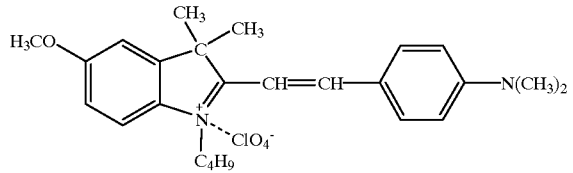

(I-4)

-continued
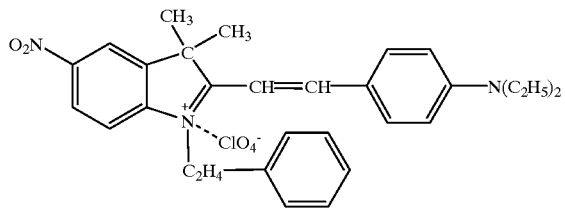
(I-5)
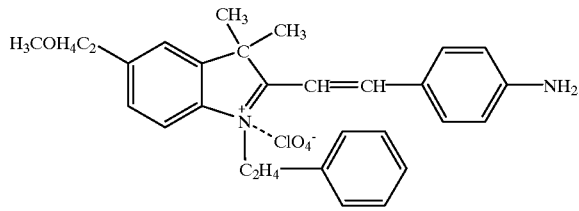
(I-6)
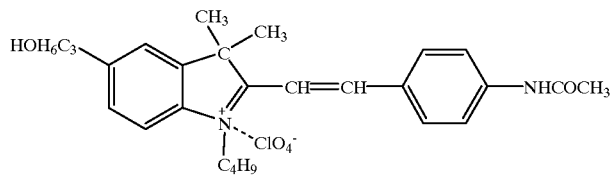
(I-7)
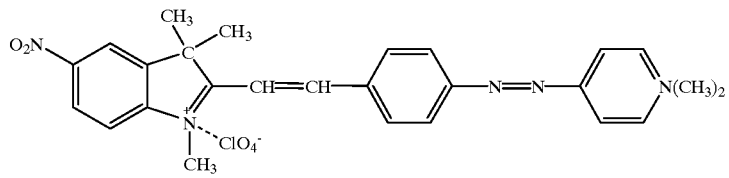
(I-8)
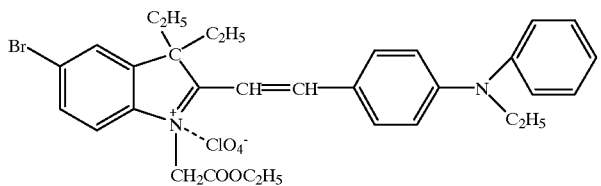
(I-9)
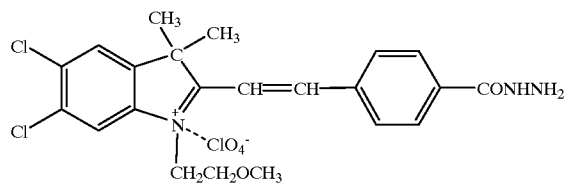
(I-10)
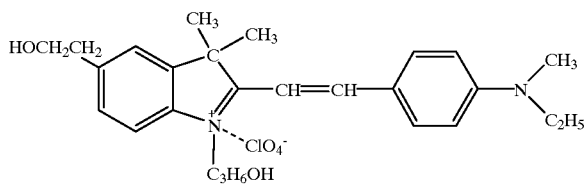
(I-11)

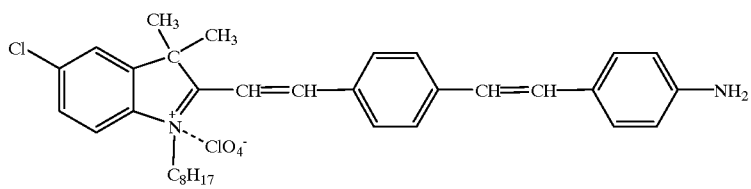
(I-12)
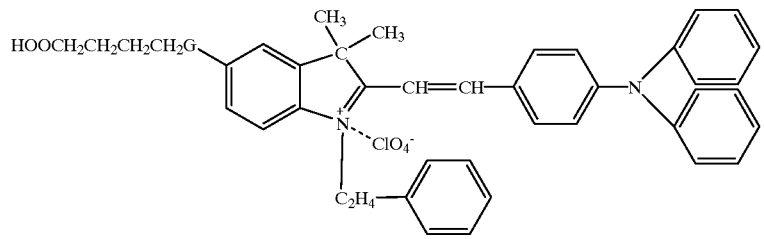
(I-13)
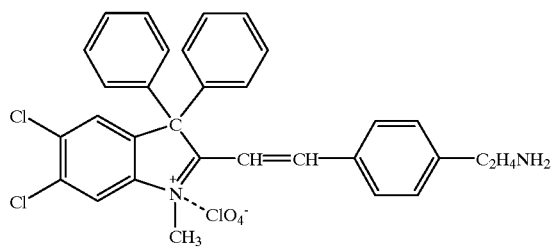
(I-14)
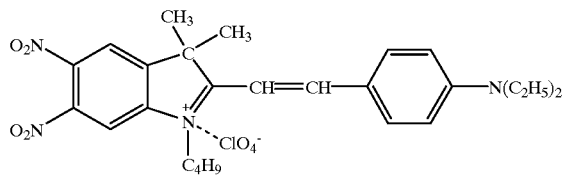
(I-15)
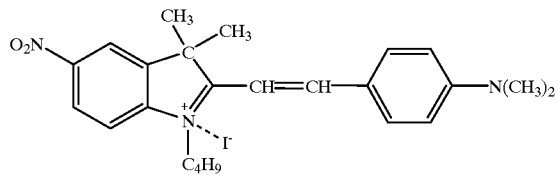
(I-16)
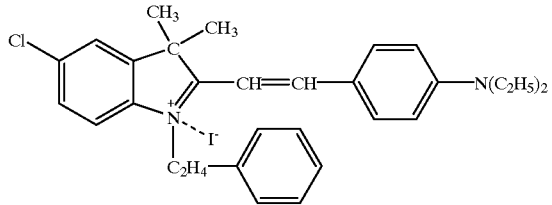
(I-17)
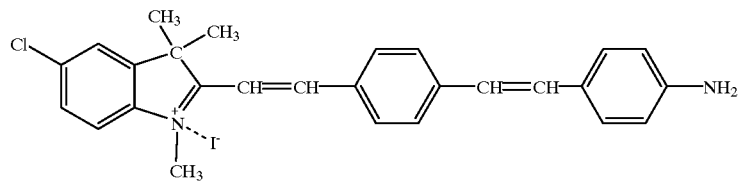
(I-18)

-continued
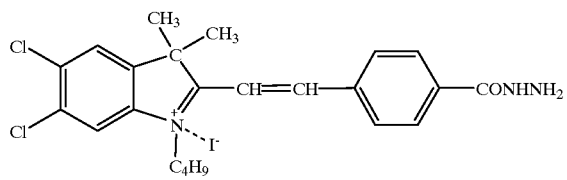
(I-19)
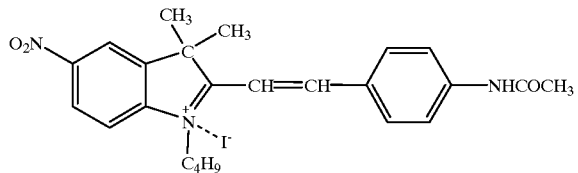
(I-20)
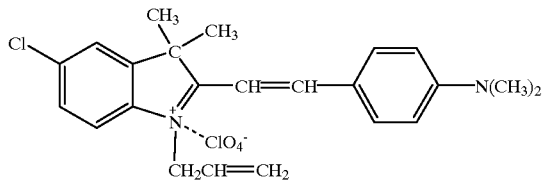
(I-21)
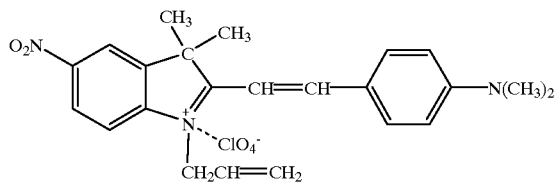
(I-22)
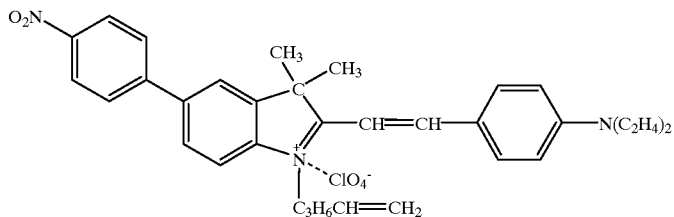
(I-23)
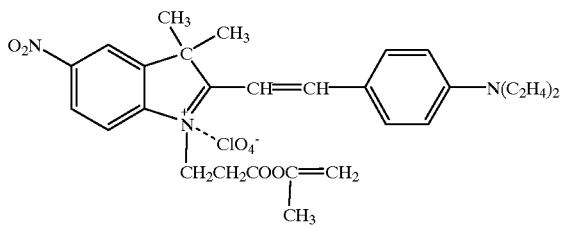
(I-24)
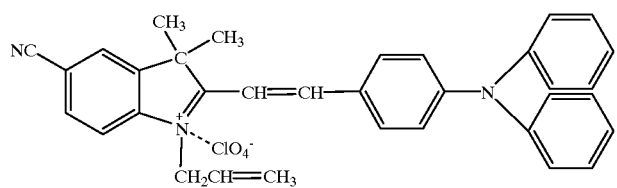
(I-25)

-continued
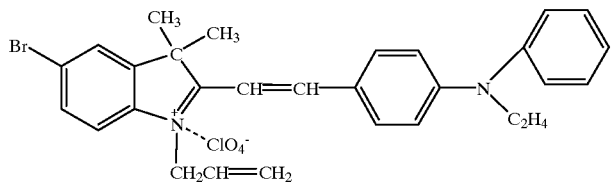
(I-26)
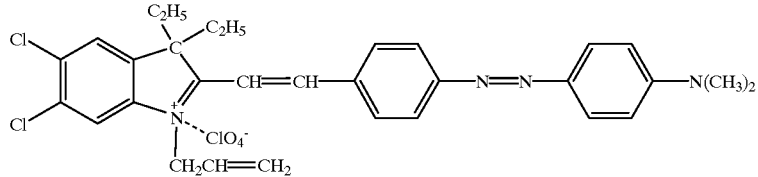
(I-27)
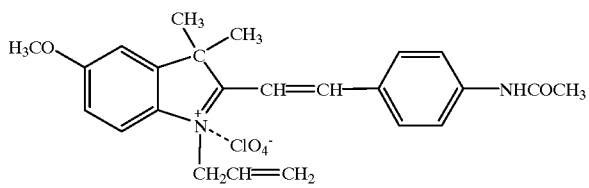
(I-28)
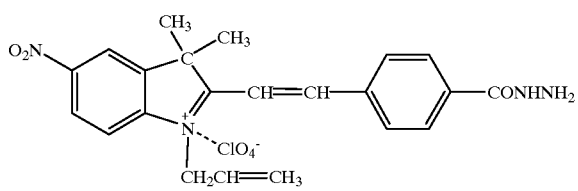
(I-29)
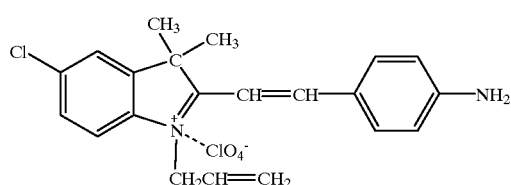
(I-30)
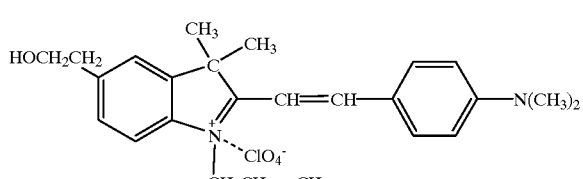
(I-31)
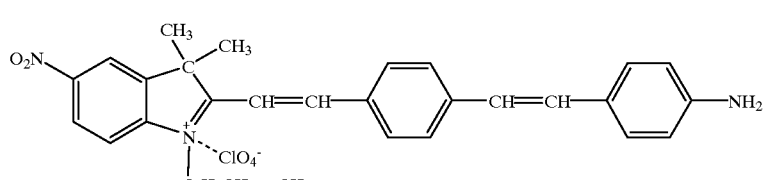
(I-32)
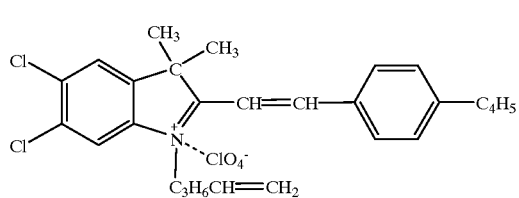
(I-33)

-continued

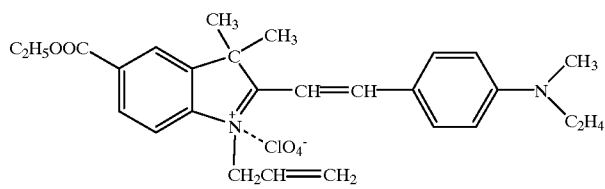

(I-34)

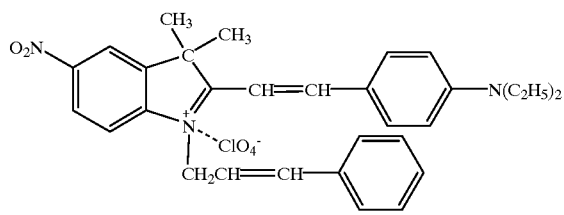

(I-35)

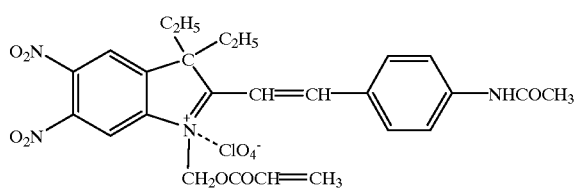

(I-36)

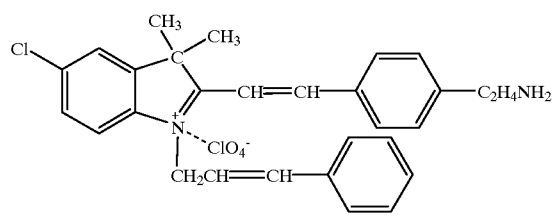

(I-37)

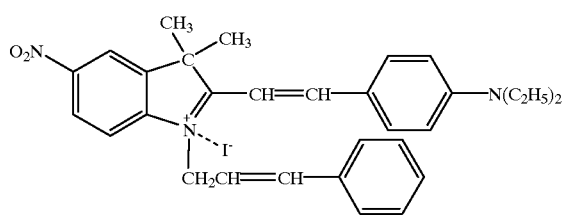

(I-38)

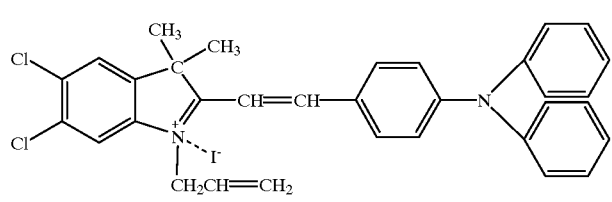

(I-39)

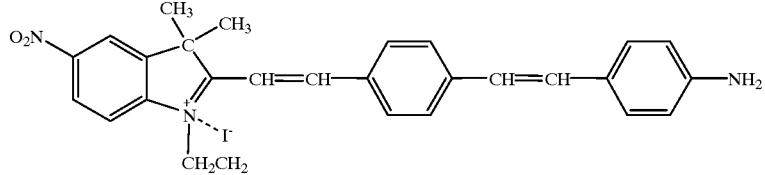

(I-40)

The styrylcyanine dye of the invention may be used alone. However, the combination of two or more of the styrylcyanine dyes makes it possible to adjust the spectral properties, such as absorption and reflectance of laser light, and ensure the stability of the resulting thin film in an amorphous state. Because of these functions, high sensitivity can be achieved, jitter components inhibited, and noise generation prevented, with improvement in long-term storage.

The recording layer 2 may contain 1% or more, preferably 3 to 20%, of an oxygen quencher (light stabilizer) in addition to the above dye. If the content of the oxygen quencher in the recording layer is too high, the quencher may bleed, causing noises. This quencher traps radicals generated by the degradation of the styrylcyanine dye due to ultraviolet rays and laser light, thereby stopping a chain reaction. Thus, light stability can be enhanced, and discoloration due to reproducing light, in particular, can be prevented. Consequently, the recording layer related to the invention can achieve a long shelf life, can prevent the flow of the film due to heat generated by light, and can inhibit generation of noises and the increase of jitters.

The oxygen quencher used together with the styrylcyanine dye of the invention may be used alone or in combination, without restrictions. Its examples are the following in general use:

Metal Complexes

Q1: Bis(4-tetra-butyl-1,2-dithiophenolate)M-tetra-n- butylammonium (M=Cu, Co, Ni or Fe) BBT series of products, Sumitomo Seika Chemicals Co., Ltd.

Q2: Bis[4-(diethylamino)-$\alpha,\beta$-stilbenedithiolate]nickel NKX-114, Nippon Kankoh-Shikiso Kenkyusho Co., Ltd.

Q3: Bis[3-methoxy-4-(2-methoxyethoxy)-2'- chloro-$\alpha,\beta$-stilbenedithiolate]nickel NKX-1199, Nippon Kankoh-Shikiso Kenkyusho Co., Ltd.

Q4: 1,2-Benzenedithiolnickel complex PA-1006, Mitsui Toatsu Chemicals, Inc.

Amine/Ammonium Salts

Q5: Bisiminium salt IRG-03, NIPPON KAYAKU CO., LTD.

Q6: N,N,N',N"-tetrakis(p-dibutylaminophenyl)p-phenylenediamine NIR-AMI, Teikoku Kagaku Co., Ltd.

Q7: 4-Nitroso-4'-(dimethylamino)diphenylamine NKX-1549, Nippon Kankoh-Shikiso Kenkyusho Co., Ltd.

The oxygen quencher of the invention is not restricted to those exemplified above, and may be added singly or in combination.

The recording layer 2 containing the styrylcyanine dye of the invention as the essential component is laminated on the surface of the substrate(s) 1, 1', as shown in FIGS. 1 to 4. This recording layer is provided by thoroughly dissolving the dye with a coating solvent not affecting the substrate, such as methyl cellosolve, ethyl cellosolve, methanol, ethanol, isopropanol, diacetone alcohol, dimethylformamide, cyclohexanone, aceylacetone, tetrafluoropropanol, dichloroethane, or dioxane, used alone or as a mixture, and then applying the solution on the molded substrate(s) 1, 1', which has grooved formed therein, by customary means such as spin coating.

The thickness of the recording layer 2 is about 50 to 500 nm, preferably 50 to 300 nm. With the thickness of less than 50 nm, the recording sensitivity and reflectance will be insufficient for ideal recording. If the thickness exceeds 500 nm, tracking signals may fail to be obtained, or pit overlap may occur. As a result, jitters will grow, so that the waveform distortion of reproduced signals is liable to occur, or crosstalks may increase. The film thickness of the recording layer 2 can be adjusted in view of the film forming conditions, the dye concentration, and the shape of the groove.

The metallic reflecting layer (light reflecting film) 3 provided on the recording layer 2 is a metallic thin film which has a higher melting point than does the recording layer 2 of the invention, which has a reflectance of 55% or more, preferably 60% or more, for laser light, and which comprises a single metal or an alloy of metals selected from the group consisting of Al, Au, Ag, Cu, Ni, Ti and chalcogenide metals. The thickness of the metallic reflecting layer 3 is about 30 to 150 nm, preferably about 50 to 100 nm. The metallic reflecting layer 3 is laminated by sputtering, vacuum deposition, or ion plating.

The protective film 4 provided on the metallic reflecting layer 3 as shown in FIGS. 1 to 4 is generally formed by applying a photocuring (ultraviolet curing or visible light curing) resin by spin coating, spray coating or gravure coating, then irradiating the coating with ultraviolet radiation or visible light to cure it. Furthermore, an epoxy resin, an acrylic resin, or a silicone resin may be formed into the protective film 4 by the wet process. Alternatively, an inorganic film such as an $SiO_x$ layer may be formed by sputtering or the evaporation method. The protective film 4 may also be a polymer film formed by depositing a resin such as Parylene, polyamide or polyimide by the evaporation method or the plasma CVD method. The protective film 4 may be in the form of a sheet. The thickness of the protective film 4 may be about 0.5 to 50 $\mu$m.

In the double-sided laminate media shown in FIGS. 2 and 3, the constituents are bonded together using an adhesive of the hot melt type, the ultraviolet curing type or the visible light curing type or an adhesive tape to obtain a high density optical recording medium capable of double-sided recording/reproduction.

The optical recording medium of the present invention is configured to have a specific recording layer provided on a substrate, the recording layer consisting essentially of a styrylcyanine dye of a specific structure. This optical recording medium is adapted for a short wavelength laser (500 to 700 nm), has sufficiently high sensitivity and high reflectance, is excellent in recording properties, does not degrade upon reproduction, and achieves high density recording with long-term preservability and reliability, and complies with the DVD standards.

EXAMPLES

The present invention will be described by, but not restricted to, the following Examples, in which a polycarbonate substrate 6 mm thick and having grooves formed with a track pitch of 0.75 $\mu$m.

Example 1

To a styrylcyanine dye of the formula (I-2), a quencher (the aforesaid Q3 and Q7 mixed at a weight ratio of 2:1) was added to a content of 10% by weight. These materials were mixed with a solvent mixture (ethyl cellosolve/ethanol/diacetone alcohol=5:2:3 in weight ratio) to prepare a recording layer composition. This recording layer composition was thoroughly dissolved at a concentration of 5% by weight by means of supersonic waves. After filtration through a filter, the filtrate was coated on the substrate by spin coating to obtain a recording layer uniformly formed to a thickness of about 60 nm. Then, a metallic reflecting layer was formed by sputtering as a 60 nm thick Al—Ti alloy thin film. As a protective film, moreover, a polyfunctional epoxyacrylate type ultraviolet curing paint was applied by spin coating, and cured. Its thickness was about 6 $\mu$m.

A recording medium in the form of a single plate was obtained by the above-described method. To make it a double-sided type, an ultraviolet curing adhesive was used for an adhesive layer, and protective layers were bonded together face-to-face by low temperature pressure bonding to obtain a desired double-sided optical recording medium.

Example 2

The same quencher as in Example 1 was added to a 2:1 (weight ratio) mixture of styrylcyanine dyes of the general formulae (I-2) and (I-10), and a desired optical recording medium was obtained in accordance with the same means and constitution as in Example 1.

Example 3

A quencher (the aforesaid complex Q1 of the Cu type and the aforesaid Q7 mixed at a weight ratio of 2:1) was used on a 2:1 (weight ratio) mixture of styrylcyanine dyes of the general formulae (I-1) and (I-5). A desired optical recording medium was obtained in accordance with the same means and constitution as in Example 1.

Comparative Example 1

A desired optical recording medium was obtained in accordance with the same means and constitution as in Example 1 by the use of a dye DY1 of the following structural formula

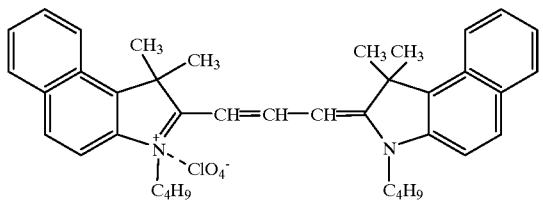

(NK-4288, Nippon Kankoh-Shikiso Kenkyusho Co., Ltd.) as a laser absorbing dye, and the use of the same quencher as in Example 1.

Comparative Example 2

A desired optical recording medium was obtained in accordance with the same means and constitution as in Example 1 by the use of a 2:1 (weight ratio) mixture of the dye DY1 of the above-mentioned structural formula and a dye DY2 of the following structural formula

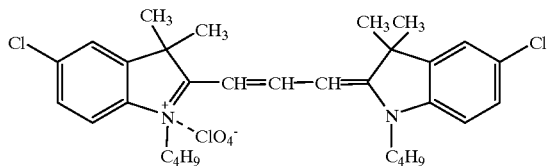

(NK-4400, Nippon Kankoh-Shikiso Kenkyusho Co., Ltd.) as a laser absorbing dye, and the use of the same quencher as in Example 1.

Example 4

The same quencher as in Example 1 was added to a styrylcyanine dye of the general formula (I-22), and a desired optical recording medium was obtained in accordance with the same means and constitution as in Example 1.

Example 5

The same quencher as in Example 1 was added to a 2:1 (weight ratio) mixture of styrylcyanine dyes of the general formulae (I-22) and (I-21), and a desired optical recording medium was obtained in accordance with the same means and constitution as in Example 1.

Example 6

A quencher (the aforesaid complex Q1 of the Cu type and the aforesaid Q7 mixed at a weight ratio of 2:1) was used on a 2:1 (weight ratio) mixture of styrylcyanine dyes of the general formulae (I-24) and (I-30). A desired optical recording medium was obtained in accordance with the same means and constitution as in Example 1.

Example 7

The same quencher as in Example 1 was added to a 1:1 (weight ratio) mixture of styrylcyanine dyes of the general formulae (I-35) and (I-21), and a desired optical recording medium was obtained in accordance with the same means and constitution as in Example 1.

Comparative Example 3

A desired optical recording medium was obtained in accordance with the same means and constitution as in Example 1 by the use of a dye DY2 of the following structural formula

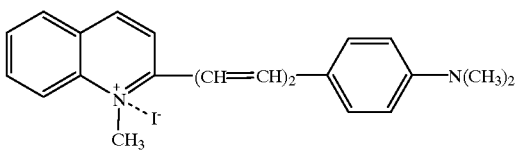

(NK-383, Nippon Kankoh-Shikiso Kenkyusho Co., Ltd.) as a laser absorbing dye, and the use of the same quencher as in Example 1.

Comparative Example 4

A desired optical recording medium was obtained in accordance with the same means and constitution as in Example 1 by the use of a 2:1 (weight ratio) mixture of the dye DY2 of the above-mentioned structural formula and a dye DY3 of the following structural formula

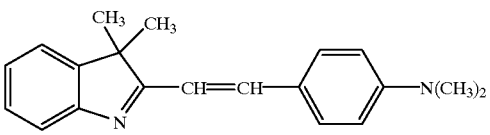

(NK-1977, Nippon Kankoh-Shikiso Kenkyusho Co., Ltd.) as a laser absorbing dye, and the use of the same quencher as in Example 1.

Comparative Example 5

The same quencher as in Example 1 was used on a 1:1 (weight ratio) mixture of the dyes DY2 and DY1 of the aforementioned structural formulae as a laser absorbing dye, and a desired optical recording medium was obtained in accordance with the same means and constitution as in Example 1.

Optical recording medium characteristics, i.e., reflectance and reproduced signal characteristics (C/N, error rate) were evaluated for the foregoing Examples and Comparative Examples in the following manner: Light from a semiconductor laser with an oscillation wavelength of 635 nm was focused on the disk at a linear velocity of 3.3 m/s by the use of an objective lens with a numerical aperture (NA) of 0.60 to make recording at a writing power Pw. Reproduced signals were measured, and the reproduced signal characteristics were evaluated using an evaluation system. Furthermore, the initial characteristics, the characteristics after long-term reproduction (1×10⁴ times) and the characteristics under accelerated conditions involving a high temperature and high humidity (80° C., 80%, 24 hours) were tested and evaluated.

The recording medium of Comparative Example was not adapted for the wavelength applied, and could not be evaluated. The initial characteristics of the other media were reflectances of 55% or higher, C/N ratios of 52 dB or more, and error rates of 1×10⁻⁵ or less.

The recording medium of Examples 1 to 7, in particular, had jitter of about 15% or less, while those of Comparative Examples 1 to 5 all had jitter of about 20% or more.

Furthermore, in relation to the characteristics of the optical recording medium in Examples 1 to 7 and Comparative Examples 1 to 5, the characteristics after long-term reproduction and the characteristics after testing under the accelerated conditions are shown in FIG. 1. The changes of the characteristics of optical recording medium in Examples 1 to 7 of the present invention are clearly less than those of Comparative Examples 1 to 5.

TABLE 1

|  | Change (%) in characteristics after reproduction degradation | | | | Change (%) in characteristics under high temperature and high humidity (80° C., 80%, 24 h) | | | |
| --- | --- | --- | --- | --- | --- | --- | --- | --- |
|  | Reflectance | C/N | Jitter | Error rate | Reflectance | C/N | Jitter | Error rate |
| Example 1 | Ca.7 | Ca.18 | Ca.20 | Ca.15 | Ca.10 | Ca.15 | Ca.20 | Ca.25 |
| Example 2 | Ca.5 | Ca.8 | Ca.12 | Ca.14 | Ca.5 | Ca.9 | Ca.13 | Ca.14 |
| Example 3 | Ca.5 | Ca.5 | Ca.10 | Ca.10 | Ca.4 | Ca.6 | Ca.10 | Ca.12 |
| Comparative Example 1 | Ca.20 | Ca.30 | Ca.45 | Not measurable | Ca.50 | Ca.50 | Not measurable | Not measurable |
| Comparative Example 2 | Ca.15 | Ca.20 | Ca.30 | Ca.30 | Ca.22 | Ca.20 | Ca.35< | Ca.30 |
| Example 4 | Ca.6 | Ca.15 | Ca.18 | Ca.14 | Ca.9 | Ca.12 | Ca.15 | Ca.23 |
| Example 5 | Ca.5 | Ca.6 | Ca.10 | Ca.10 | Ca.5 | Ca.8 | Ca.10 | Ca.12 |
| Example 6 | Ca.3 | Ca.5 | Ca.7 | Ca.8 | Ca.4 | Ca.4 | Ca.8 | Ca.9 |
| Example 7 | Ca.4 | Ca.5 | Ca.8 | Ca.10 | Ca.5 | Ca.7 | Ca.9 | Ca.10 |
| Comparative Example 1 | Ca.20 | Ca.30 | Ca.45 | Not measurable | Ca.50 | Ca.50 | Not measurable | Not measurable |
| Comparative Example 3 | Ca.25 | Ca.30 | 50< | Ca.40< | Ca.50 | Ca.45 | Not measurable | Not measurable |
| Comparative Example 4 | Ca.25 | Ca.30 | Ca.30 | Ca.35 | Ca.35 | Ca.40 | Not measurable | Not measurable |
| Comparative Example 5 | Ca.20 | Ca.20 | Ca.30 | Ca.30 | Ca.20 | Ca.25 | Ca.25 | Ca.30 |

In conclusion, the optical recording medium of the present invention is configured to have a specific recording layer provided on a substrate, the recording layer consisting essentially of a styrylcyanine dye of a specific structure. This optical recording medium is adapted for a short wavelength laser (500 to 700 nm), has sufficiently high sensitivity and high reflectance, is minimal in degradation upon reproduction, is excellent in long-term preservability and reliability, reduces jitter components to achieve high density recording, and complies with the DVD standards.

The present invention has been described in detail with respect to various embodiments, and it will now be apparent from the foregoing to those skilled in the art that changes and modifications may be made without departing from the invention in its broader aspects, and it is my intention, therefore, in the appended claims to cover all such changes and modifications as fall within the true spirit of the invention.

What is claimed is:

1. An optical recording medium comprising at least a recording layer and a metallic reflecting layer laminated on the surface of a resin substrate which has grooves formed therein and which is transparent to laser light; wherein
    the recording layer comprises an organic thin film consisting essentially of a styrylcyanine dye of the following general formula (I)

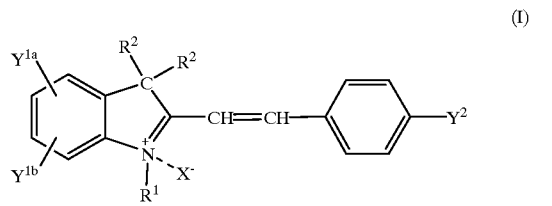

where $R^1$ represents an alkyl group, an aryl group, an arylalkyl group, an alkoxyalkyl group, an acyloxyalkyl group, or a hydroxyalkyl group, each having 1 to 18 carbon atoms, $R^2$ represents an alkyl group or an aryl group, the anion $X^-$ represents $I^-$, $Br^-$, $ClO_4^-$, $BF_4^-$, $PF_4^-$, $SbF_4^-$, $CH_3SO_4^-$, or $CH_3$—$C_6H_4$—$SO_3$—, both of $Y^{1a}$ and $Y^{1b}$ represent electron attractive groups, or one of $Y^{1a}$ and $Y^{1b}$ represents an electron attractive group, the other representing a hydrogen atom, and $Y^2$ represents an electron donative group, said organic thin film being adapted for a short wavelength laser.

2. The optical recording medium of claim 1, wherein both of $Y^{1a}$ and $Y^{1b}$ represent nitro groups, hydroxyl groups, carboxyl groups, carbonyl groups, alkoxy groups, cyano groups, alkoxycyano groups, halogen atoms, or electron attractive groups each having any of them at the end, or one of $Y^{1a}$ and $Y^{1b}$ represents an electron attractive group, the other representing a hydrogen atom, and $Y^2$ represents an electron donative group which is an alkyl group or a nitrogen-containing compound derivative selected from the group consisting of —NH₂; —N(R³)₂ where R³ represents an alkyl or aryl group having 1 to 7 carbon atoms; —N(R⁴R⁵)₂ where R⁴ and R⁵ each represent, independently of each other, an alkyl or aryl group having 1 to 7 carbon atoms; a $C_1$–$C_{18}$ alkyl, aryl, arylalkenyl, arylazo, or alkoxy group having at the end —NH₂, —N(R³)₂ where R³ is as defined above, or —N(R⁴R⁵)₂ where R⁴ and R⁵ are as defined above; a hydrazinocarbonyl group; and an acetamide group.

3. The optical recording medium of claim 1, wherein the recording layer is an organic thin film comprising a mixture containing two or more of the styrylcyanine dyes of the general formula (I).

4. The optical recording medium of claim 1, wherein the recording layer contains not less than 1% of an oxygen quencher.

5. The optical recording medium of claim 1, comprising the metallic reflecting layer laminated on the recording layer, said metallic reflecting layer being a metallic thin film which has a higher melting point than the melting point of the recording layer, has a reflectance of 55% or more for a wavelength of laser light, and comprises a single metal or an alloy of metals selected from the group consisting of Al, Au, Ag, Cu, Ni, Ti and chalcogenide metals.

6. The optical recording medium of claim 1, comprising the metallic reflecting layer and a protective layer sequentially laminated on the recording layer.

7. The optical recording medium of claim 1, comprising a single-sided type substrate and a groove-free substrate bonded together using an adhesive, said single-sided type substrate being the grooved substrate on which the recording layer and the metallic reflecting layer have been laminated in this order, and a protective layer has been further laminated.

8. The optical recording medium of claim 1, which is a double-sided type optical recording medium comprising a single-sided type substrate and another single-sided type substrate bonded together via protective layers by the use of an adhesive, each of said single-sided type substrates being the grooved substrate having the recording layer and the metallic reflecting layer laminated thereon in this order, and the protective layer further laminated on the layers.

9. The optical recording medium of claim 1, which is a double-sided type optical recording medium comprising the substrate having grooves formed in both surfaces thereof during molding, the recording layer, the metallic reflecting layer, and further a protective layer laminated on both surfaces of the substrate in this order.

10. An optical recording medium comprising at least a recording layer and a metallic reflecting layer laminated on the surface of a resin substrate which has grooves formed therein and which is transparent to laser light; wherein the recording layer comprises an organic thin film consisting essentially of a styrylcyanine dye of the following general formula (I)

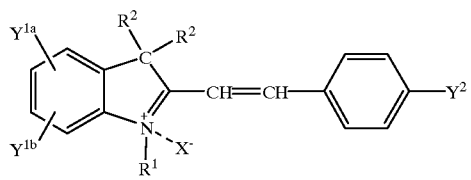

(I)

where R¹ represents a C₃₋₁₈ substituent having an unsaturated bond, R² represents an alkyl group or an aryl group, the anion X⁻ represents I⁻, Br⁻, ClO₄⁻, BF₄⁻, PF₄⁻, SbF₄⁻, CH₃SO₄⁻, or CH₃—C₆H₄—SO₃—, both of Y$^{1a}$ and Y$^{1b}$ represent electron attractive groups, or one of Y$^{1a}$ and Y$^{1b}$ represents an electron attractive group, the other representing a hydrogen atom, and Y² represents an electron donative group, said organic thin film being adapted for a short wavelength laser.

11. The optical recording medium of claim 10, wherein both of Y$^{1a}$ and Y$^{1b}$ represent nitro groups, hydroxyl groups, carboxyl groups, carbonyl groups, alkoxy groups, cyano groups, alkoxycyano groups, halogen atoms, or electron attractive groups each having any of them at the end, or one of Y$^{1a}$ and Y$^{1b}$ represents an electron attractive group, the other representing a hydrogen atom, and Y² represents an electron donative group which is an alkyl group or a nitrogen-containing compound derivative selected from the group consisting of —NH₂; —N(R³)₂ where R³ represents an alkyl or aryl group having 1 to 7 carbon atoms; —N(R⁴R⁵)₂ where R⁴ and R⁵ each represent, independently of each other, an alkyl or aryl group having 1 to 7 carbon atoms; a C₁–C₁₈ alkyl, aryl, arylalkenyl, arylazo, or alkoxy group having at the end —NH₂, —N(R³)₂ where R³ is as defined above, or —N(R⁴R⁵)₂ where R⁴ and R⁵ are as defined above; a hydrazinocarbonyl group; and an acetamide group.

12. The optical recording medium of claim 10, wherein the recording layer is an organic thin film comprising a mixture containing two or more of the styrylcyanine dyes of the general formula (I).

13. The optical recording medium of claim 10, wherein the recording layer contains not less than 1% of an oxygen quencher.

14. The optical recording medium of claim 10, comprising the metallic reflecting layer laminated on the recording layer, said metallic reflecting layer being a metallic thin film which has a higher melting point than the melting point of the recording layer, has a reflectance of 55% or more for a wavelength of laser light, and comprises a single metal or an alloy of metals selected from the group consisting of Al, Au, Ag, Cu, Ni, Ti and chalcogenide metals.

15. The optical recording medium of claim 10, comprising the metallic reflecting layer and a protective layer sequentially laminated on the recording layer.

16. The optical recording medium of claim 10, comprising a single-sided type substrate and a groove-free substrate bonded together using an adhesive, said single-sided type substrate being the grooved substrate on which the recording layer and the metallic reflecting layer have been laminated in this order, and a protective layer has been further laminated.

17. The optical recording medium of claim 10, which is a double-sided type optical recording medium comprising a single-sided type substrate and another single-sided type substrate bonded together via protective layers by the use of an adhesive, each of said single-sided type substrates being the grooved substrate having the recording layer and the metallic reflecting layer laminated thereon in this order, and the protective layer further laminated on the layers.

18. The optical recording medium of claim 10, which is a double-sided type optical recording medium comprising the substrate having grooves formed in both surfaces thereof during molding, the recording layer, the metallic reflecting layer, and further a protective layer laminated on both surfaces of the substrate in this order.

* * * * *